United States Patent
Brown et al.

(10) Patent No.: US 6,707,830 B1
(45) Date of Patent: Mar. 16, 2004

(54) METHOD AND SYSTEM FOR UPGRADING A TERMINAL TO TERMINAL LINK IN A TELECOMMUNICATION SYSTEM

(75) Inventors: Mike A. Brown, Plano, TX (US); Richard Doll, Plano, TX (US); Martin Gallant, Garland, TX (US); Scott W. Noble, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/197,217

(22) Filed: Nov. 20, 1998

(51) Int. Cl.[7] .................................................. H04J 3/12
(52) U.S. Cl. ..................................................... 370/524
(58) Field of Search ................................ 370/328, 410, 370/475, 522, 465, 466, 524; 375/222; 379/22.01, 22.02, 27.01, 27.02, 27.03

(56) References Cited

U.S. PATENT DOCUMENTS

| | | | | |
|---|---|---|---|---|
| 4,953,210 A | * | 8/1990 | McGlynn et al. | 380/266 |
| 5,473,679 A | * | 12/1995 | La Porta et al. | 370/410 |
| 5,481,562 A | * | 1/1996 | Pearson et al. | 375/222 |
| 5,754,552 A | * | 5/1998 | Allmond et al. | 370/257 |
| 5,796,808 A | * | 8/1998 | Scott et al. | 379/93.31 |
| 6,002,689 A | * | 12/1999 | Christie et al. | 370/401 |
| 6,005,846 A | * | 12/1999 | Best et al. | 370/264 |
| 6,181,703 B1 | * | 1/2001 | Christie et al. | 370/410 |
| 6,327,260 B1 | * | 12/2001 | McGrew | 370/217 |

* cited by examiner

Primary Examiner—Chi Pham
Assistant Examiner—Keith M. George
(74) Attorney, Agent, or Firm—John D. Crane; Bracewell & Patterson, L.L.P.

(57) ABSTRACT

In accordance with the method and system of the present invention, a first link protocol utilizing a set mode command is sent from one or more transmit terminals to establish a link with one or more receive terminals. The set mode command comprises a frame format including an identifying byte field in accordance with International Telecommunication Union's Q.921 Annex E protocol specification. The one or more transmit terminals wait a predetermined T200 time interval to receive a response from the one or more receive terminals to determine if the link is established. If a response is not received from the one or more receive terminals, the one or more transmit terminals resends the set mode command a predetermined N200 times. If the link is still not established within the predetermined N200 times, a second link protocol utilizing a set asynchronous balanced mode extended command having a different identifying byte field in accordance with International Telecommunication Union's Q.921 protocol specification is sent to the one or more receive terminals to establish the link.

17 Claims, 5 Drawing Sheets

| | Bit 8 | Bit 7 | Bit 6 | Bit 5 | Bit 4 | Bit 3 | Bit 2 | Bit 1 | Field description |
|---|---|---|---|---|---|---|---|---|---|
| 1 | 0 | 1 | 1 | 1 | 1 | 1 | 1 | 0 | Flag |
| 2 | Service Access Point Identifier (SAPI) | | | | | | C/R | EA=0 | Address Field |
| 3 | Terminal Endpoint Identifier (TEI) | | | | | | | EA=1 | (2 bytes) |
| 4 | 0 | 1 | 1 | P | 1 | 1 | 1 | 1 | Control Field |
| 5 | Frame Check Sequence (MSB) | | | | | | | | Frame Check Sequence |
| 6 | Frame Check Sequence (LSB) | | | | | | | | (CRC) |
| 7 | 0 | 1 | 1 | 1 | 1 | 1 | 1 | 0 | Flag |

*Fig. 3*

| | Bit 8 | Bit 7 | Bit 6 | Bit 5 | Bit 4 | Bit 3 | Bit 2 | Bit 1 | Field description |
|---|---|---|---|---|---|---|---|---|---|
| 1 | 0 | 1 | 1 | 1 | 1 | 1 | 1 | 0 | Flag |
| 2 | Service Access Point Identifier (SAPI) | | | | | | C/R | EA=0 | Address Field (2 bytes) |
| 3 | Terminal Endpoint Identifier (TEI) | | | | | | | EA=1 | |
| 4 | 1 | 1 | 0 | P | 0 | 0 | 1 | 1 | Control Field |
| 5 | 1 | 0 | 0 | 0 | 0 | 0 | 0 | 1 | Format Identifier |
| 6 | 1 | 0 | 0 | 0 | 0 | 0 | 0 | 1 | Group Identifier |
| 7 | 0 | 0 | 0 | 0 | 0 | 0 | 1 | 0 | Group Length = 2 |
| 8 | 0 | 0 | 0 | 0 | 0 | 0 | 0 | 1 | Mode of Operation = ABM |
| 9 | 0 | 0 | 0 | 0 | 0 | 0 | 1 | 0 | Modulus of Operation = 128 |
| 10 | Frame Check Sequence (MSB) | | | | | | | | Frame Check Sequence (CRC) |
| 11 | Frame Check Sequence (LSB) | | | | | | | | |
| 12 | 0 | 1 | 1 | 1 | 1 | 1 | 1 | 0 | Flag |

Fig. 4

METHOD AND SYSTEM FOR UPGRADING A TERMINAL TO TERMINAL LINK IN A TELECOMMUNICATION SYSTEM

BACKGROUND OF THE INVENTION

1. Technical Field

The present invention relates in general to linking in a telecommunication system and in particular to a method for upgrading the link within the telecommunication system. Still more particularly, the present invention relates to a method and system for link establishment that accommodates different link protocols for providing backward compatibility within a telecommunication or information handling system.

2. Description of the Related Art

Today, most of the transmission between telephone exchanges is digital, but the transmission and the signaling between a local exchange and a customer is still analogue. Because different users have different requirements (telephony, fax, data) in the existing analogue network, it is necessary to use separate telephone lines with separate characteristics for the different users. To solve this problem a new universal interface has evolved. This new network evolution is called the Integrated Services Digital Network (ISDN). ISDN is a versatile network in which all kinds of information technology are transmitted in a digital format between terminals. The ISDN digital access provides the end users with the possibility of initializing end-to-end digital connections that can support a variety of services, such as: high quality speech, audio, video telephony, video conference, as well as fax, data and image transfer capabilities.

To ensure that voice and signaling or data and signaling information can be transmitted simultaneously in ISDN with no mutual reference, multiple channels are provided on an ISDN access and are defined by the International Telecommunication Union (ITU) in a series of protocol specifications. These channels are identified as B-channels and D-channels respectively. The B-channels are used for information transfer, such as speech, text, data and images. The D-channel is used for call control signaling procedures and may also be used to carry packet-switched data. The call control signaling information on the D-channel is used to establish, supervise and release the circuit-switched connections being requested for.

Unlike the B-channels, which function as "pipes," the D-channel is associated with higher level ITU protocol specifications defined by an Open System Interconnection (OSI) model. The OSI model has 7 protocol specification layers in which layers 2 and 3 of the model form the packet-switched connections associated with the D-channel. Within the layer 3 protocol specifications for use on the D-channel is a call-control protocol component. This layer 3 signaling protocol is transferred on the D-channel using the layer 2 protocol referred to as the Link Access Procedure-D-channel (LAPD.) Although the layer 3 protocol takes care of most ISDN signaling requirements, the LAPD layer 2 protocol utilizes frames that play a very important role in terms of low-level signaling to ISDN devices. These LAPD frames contain the information to ensure that incoming calls are routed to the appropriate ISDN device, and pass the addressing information that distinguishes ISDN devices on a single line from each other.

To initially establish a point-to-point link between two terminals, a command frame is sent along the D-channel from a transmit terminal to a receive terminal. The command frame has a predetermined byte structure recognized at the receive terminal in accordance with the ITU protocol specification. However, a problem has arisen due to a new protocol introduced by the ITU that provides a different command frame for establishing a link that is not compatible with the old protocol specification. The problem arises when an upgraded terminal tries to establish a link with a terminal that does not recognize the different command frame and therefore has not been upgraded. Currently there is no method for determining which protocol terminals should be using when establishing a link.

Therefore, there is a need for a link establishment procedure in which the proper protocol between two terminals can be initially determined and invoked. The subject invention herein solves this problem in a new and unique manner that has not been part of the art previously.

SUMMARY OF THE INVENTION

It is therefore an object of the present invention to provide a method and system for upgrading a link within a telecommunication system or information handling system.

It is therefore another object of the present invention to provide a method and system for link establishment that accommodates different link protocols for providing backward compatibility within a telecommunication or information handling system.

The foregoing objects are achieved as is now described. A first link protocol utilizing a set mode command is sent from one or more transmit terminals to establish a link with one or more receive terminals. The set mode command comprises a frame format including an identifying byte field in accordance with International Telecommunication Union's Q.921 Annex E protocol specification. The one or more transmit terminals wait a predetermined T200 time interval to receive a response from the one or more receive terminals to determine if the link is established. If a response is not received from the one or more receive terminals, the one or more transmit terminals resends the set mode command a predetermined N200 times. If the link is still not established within the predetermined N200 times, a second link protocol utilizing a set asynchronous balanced mode extended command having a different identifying byte field in accordance with International Telecommunication Union's Q.921 protocol specification is sent to the one or more receive terminals to establish the link.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a SABME command frame in accordance with a preferred embodiment of the present invention;

FIG. 4 depicts a different command frame, an SM Command Frame in accordance with a preferred embodiment of the present invention.

DETAILED DESCRIPTION OF THE PREFERRED EMBODIMENT

Figure 1:
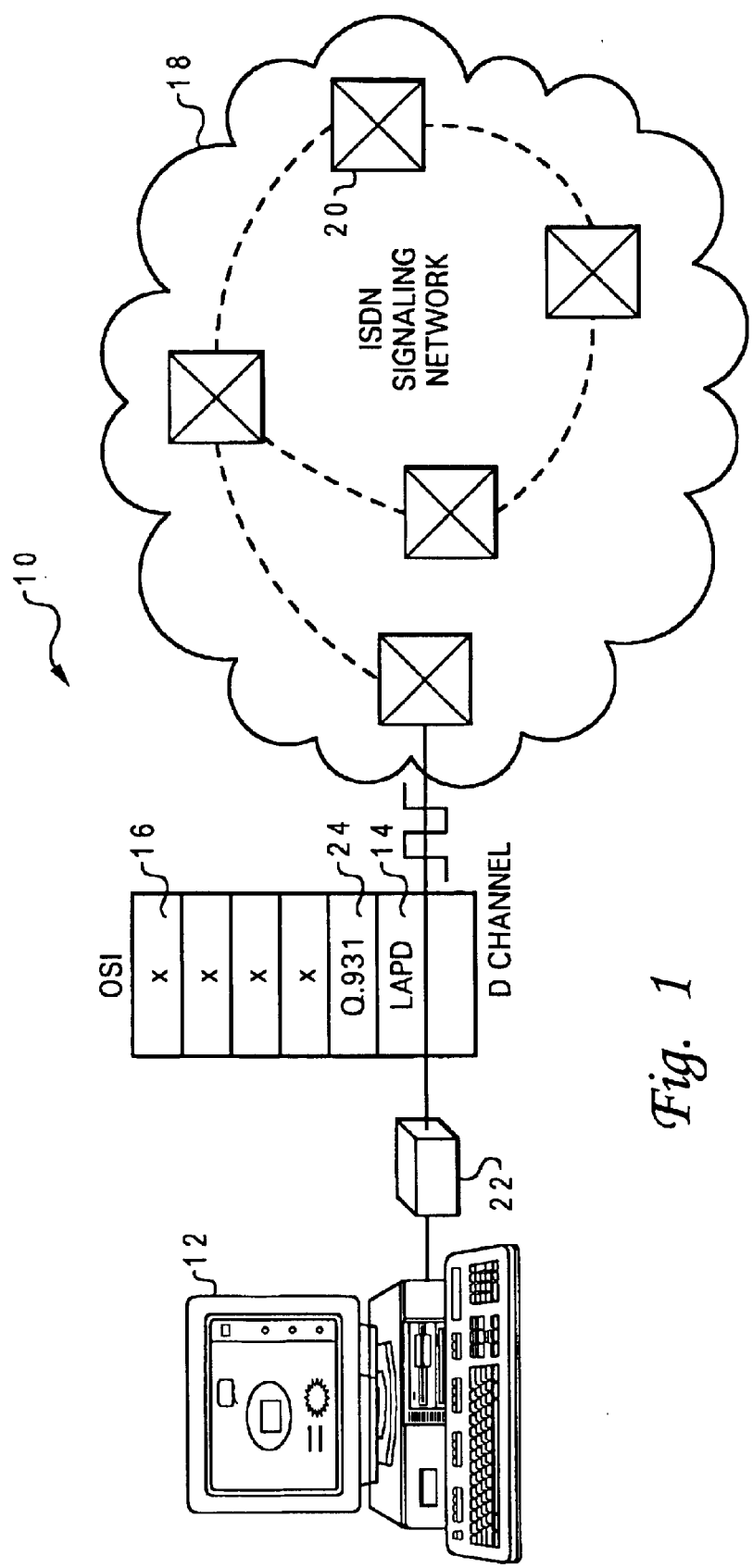
FIG. 1 depicts a block diagram of a Integrated Services Digital Network in which a preferred embodiment of the present invention may be implemented.

With reference now to the figures and in particular with reference to FIG. 1, there is depicted a block diagram of an illustrative embodiment of a telecommunication system with which the present invention may advantageously be utilized. The illustrative embodiment depicted in FIG. 1 is a computer workstation linked into an Integrated Services Digital Network, however, as will become apparent from the following description, the present invention may also be applied to any type of data processing, telephony or information handling system.

As illustrated in FIG. 1, the telecommunication system 10 includes a computer workstation or data processing system 12 linked to an Integrated Services Digital Network (ISDN) 18. In the depicted embodiment, the computer 12 is connected or linked to a switch stream 20 within the ISDN 18 through a modem 22. To ensure that voice and signaling or data and signaling information can be transmitted simultaneously within the ISDN 18, multiple channels are provided as defined by the International Telecommunication Union (ITU) in a series of protocol specifications. These channels are identified as B-channels and D-channels respectively. The B-channels are used for information transfer, such as speech, text, data and images. As shown in FIG. 1, the D-channel is used for call control signaling procedures and may also be used to carry packet-switched data. The call control signaling information on the D-channel is used to establish, supervise and release the circuit-switched connections 20 being requested for.

Referring once again to FIG. 1, there is shown an Open Systems Interconnection (OSI) model 16 for depicting a layered signaling protocol architecture used for link establishment and data communication flow within the telecommunication system 10. The model 16 provides for seven layers of interactions that occur between terminals and are defined by the International Telecommunications Union (ITU) in a series of protocol specifications. As shown in FIG. 1, the Link Access Protocol for the D-channel (LAPD) defined by the ITU-T Q.921 protocol specification is the second layer (Layer-2) 14 with the ITU-T Q.931 protocol specification defining the third layer (Layer-3) 24.

Figure 2:
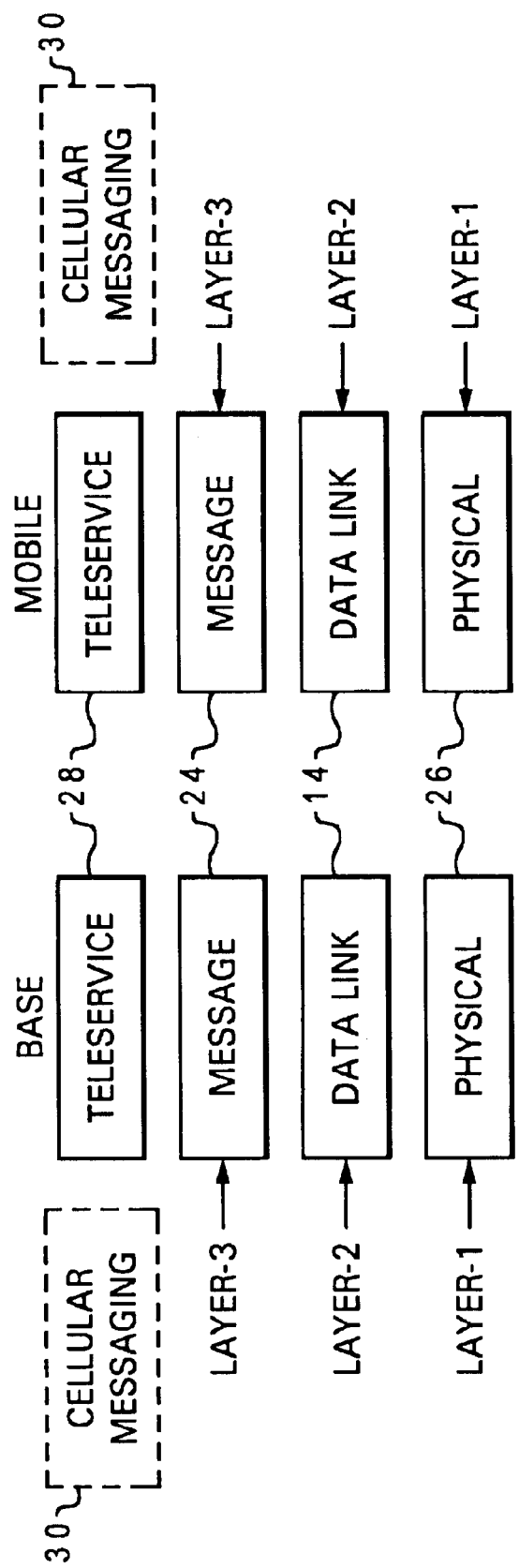
FIG. 2 is a high level block diagram of an air-interface model in which a preferred embodiment of the present invention may be implemented.

Turning now to FIG. 2, a high level block diagram depicting an air interface model for cellular messaging 30 which also uses the OSI seven layered model shown in FIG. 1 in accordance with the present invention is illustrated. As shown in FIG. 2, the first layer (Layer-1) 26 is a physical layer that deals with the radio interface, burst, slots, frames, and superframes in telecommunication interactions. The second layer 14 (Layer-2) is the data link that handles the data packaging, error correction, and message transport and is the layer in which the method of the preferred embodiment of the present invention is applied. The third layer 24 (Layer-3) is the message layer, which creates, and handles messages sent and received across the air. The remaining four upper application layers represent the teleservice 28 currently being used, such as voice and messaging transactions, or future services like on-air programming.

Referring now to FIG. 3, there is shown a frame 32 that is initially sent by a transmit terminal along the Layer-2 D-channel for decoding by a receive terminal when first establishing a link connection. The frame 32 is structured or formatted in accordance with the ITU-T Q.921 protocol specification and consists of seven (7) bytes each having a length of eight (8) bits 34. As shown in FIG. 3, at the start 36 and end 44 of frame 32 is a flag sequence consisting of one 0 bit followed by six contiguous 1 bits and one zero. The flag preceding the address field 38 is defined as the opening flag 36 and the flag following the Frame Check Sequence (LSB) 43 is defined as the closing flag 44 so that the receiving terminal knows to decode the information formatted between the opening and closing flags.

Referring once again to FIG. 3, the frame 32 includes an address field format which contains the address field extension bits, a command/response bit (C/R), a data link layer Service Access Point Identifier (SAPI) subfield 37, and a Terminal Endpoint Identifier (TEI) subfield 38. These two bytes define the commands and responses that are used on the data link connections carried on the D-channel. The SAPI 37 identifies a point at which data link layer services are provided by a data link layer entity to a Layer-3 or management entity. The TEI 38 identifies the type of terminal equipment being used. The control field 40 is shown as the fourth byte and identifies the type of frame that will either be a command or a response. It is this field that is decoded by a receive terminal when a link is initially being established in accordance with the ITU-T Q.921 specification. The frame check sequence bytes MSB 42 and LSB 43 are used in transmission error checking and not part of the methodology of the present invention. In operation, the transmit terminal sends out the frame 32 (referred to as the Set Asynchronous Balanced Mode Extended SABME) with the control field parameters 40 set which are decoded by a receive terminal. The receive terminal then resends frame 32 with the control field parameters set in a response mode that establishes a link for the transmitting of information frames between the two terminals.

Turning now to FIG. 4, there is shown a different frame 46 (referred to as the Set Mode Command SM) that is structured or formatted in accordance with the ITU-T Q.921 Annex E protocol specification and consists of twelve (12) bytes each having a length of eight (8) bits 34. As shown, Frame 46 is similar to frame 32 in that the command/response bit (C/R), data link layer Service Access Point Identifier (SAPI) 37, Terminal Endpoint Identifier (TEI) 38, MSB 42 and LSB 43 between the opening and closing flags 36 and 44, respectively, are the same. The difference between frame 32 and frame 46 is in a different control field 50 byte format that establishes a link with a terminal that has the upgraded Annex E software. The Annex E software utilizing the set mode command places the terminal frame transfer into multiple frame acknowledgement operation and invokes a multi-selective reject error recovery procedure. Also, as shown in FIG. 4, optional byte fields, namely, a format identifier 52, group identifier 54, group length 56, mode of operation 58 and modulus of operation 60 may be provided in linking ISDN devices to each other.

Figure 5:
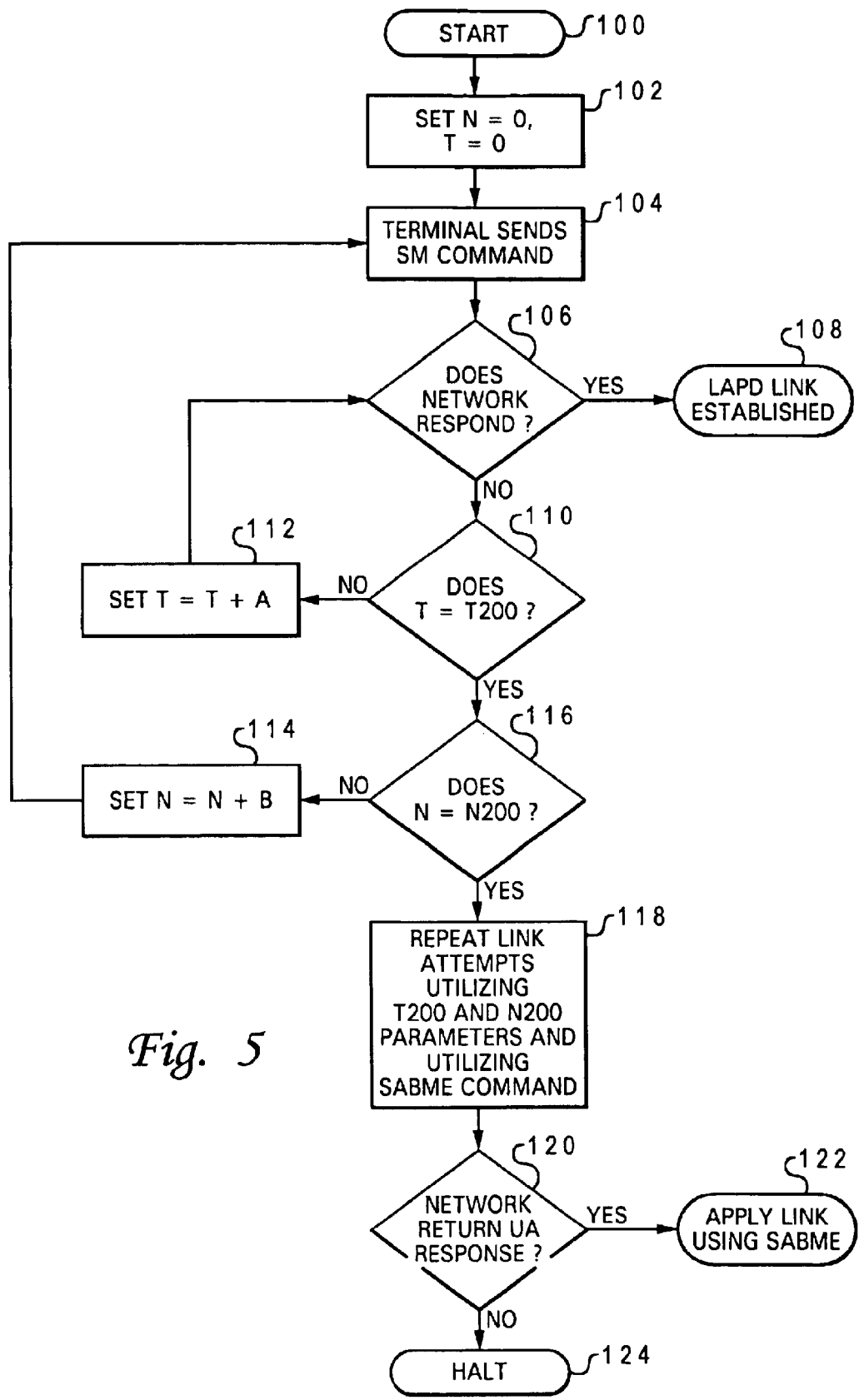
FIG. 5 is a high-level logic flow diagram of a method for determining the link protocol between two terminals within a network environment in accordance with a preferred embodiment of the present invention.

To initially establish a point-to-point link between two terminals, one of the above-described command frames must be sent along the D-channel from a transmit terminal to a receive terminal. As described above, each command frame has a unique predetermined byte structure sent to the receive terminal in accordance with its ITU protocol specification, either Q.921 or Q.921 Annex E in order to establish the link. With reference now to FIG. 5, a method and system for negotiating which protocol is to be used between the terminals within a telecommunication or informational handling system in accordance with the invention is depicted. The process begins at step 100, wherein a transmit terminal side assumes that the telecommunication system supports the Annex E version of the ITU-T Q.921 specification. Therefore, the SM command frame 46 is initially sent by the transmit terminal.

Referring once again to FIG. 5, step 102 illustrates setting two variables, N and T, to an initial state of zero. The variable T represents a waiting period and the variable N represents a number of attempts as will be more fully described below. With the initial variables set to zero and using the assumption that the receive terminal has been upgraded to the Annex E protocol, the transmit terminal sends a Set Mode SM command to the receive terminal, as shown in step 104. The transmit terminal waits a predetermined time period "T200" which is clocked in "A" increments for a response from the receive terminal or network, as shown in steps 110 and 112. By way of example, but not of limitation, "A" equals one second with the total time period equal to one second. If the transmit terminal receives a response from the receive terminal, the LAPD link is established as shown in step 108. If no response is received in the T200 time period, the process goes to step 116. The transmit terminal then resends the Set Mode Command a predetermined number of times "N200" in "B" increments for a response from the receive terminal or network, as shown in steps 114 and 104. By way of example, but not of limitation, "B" equals one (one attempt) with the total number of tries or N200 equal to three. As shown in FIG. 5, the transmit terminal waits for a period T200 seconds for each "B" attempt until N=N200. Once again, if the transmit terminal receives a response from the receive terminal during N200 attempts, the LAPD link is established as shown in step 108. If no response is received in the T200 time period for N200 tries, the process goes to step 118.

Turning once again to FIG. 5, if no response is received from the receive terminal or network it is assumed that the network side has not been upgraded. The transmit terminal then sends out the Set Asynchronous Balanced Mode, Extended command in accordance with the ITU-T Q.921 protocol and repeats the link attempt as shown in step 118. The transmit terminal performs the same operation described above (ie., step 106 and 116 with the SABME commands waiting for an unnumbered acknowledgement frame from the receive terminal wherein the link is established using the Q.921 protocol, as shown in steps 120 and 122. If neither protocol is accepted, then the transmit terminal halts sending command frames, as shown in step 124.

The present invention provides for a telecommunication system that negotiates the protocol to be used between terminals in the presence of two or more incompatible protocols. The method and system of the present invention is unique in that the ITU-T protocol specification provides no procedure for determining which protocol is to be used in establishing a link between terminals.

It is also important to note that although the present invention has been described in the context of a fully functional telecommunication system, those skilled in the art will appreciate that the mechanisms of the present invention are capable of being distributed as a program product in a variety of forms to any type of information handling system, and that the present invention applies equally regardless of the particular type of protocol utilized to actually establish a link connection. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for upgrading a terminal to terminal link within a telecommunication system, comprising the steps of:

(a) sending a first link command frame generated via a first communication protocol from one or more transmit terminals to one or more receive terminals to try to establish a link, said first link command frame including an identifying byte field, wherein said one or more transmit terminals are capable of transmitting multiple link command frames associated with multiple communication protocols including said first link command frame and a second link command frame generated via a second communication protocol and said one or more receive terminals are capable of receiving different link command frames including said first link command frame and said second link command frame;

(b1) determining if said link is established within a predetermined time interval;

(b2) when said link is established, decoding a set mode command at said one or more receive terminals in accordance with International Telecommunication Union's Q.921 protocol specification;

(c) responsive to said link not being established within said predetermined time interval, repeating steps through (b2) a predetermined number of times; and (d) responsive to said link not being established within said predetermined number of times, sending said second link command frame including a different byte field, wherein said determining step and said decoding step are repeated with said second link command frame, wherein further an attempt to establish said link utilizing said second link command frame is repeated up to said predetermined number of times or until said link is established.

2. The method for upgrading a terminal to terminal link within a telecommunication system according to claim 1, wherein said set mode command includes a plurality of bytes and wherein further the step of decoding said set mode command further comprises:

decoding byte four of said plurality of bytes within said set mode command.

3. The method for upgrading a terminal to terminal link within a telecommunication system according to claim 2, wherein said plurality of bytes includes a plurality of byte fields comprised of one or more bytes and wherein further the step of decoding said set mode command further comprises:

decoding one or more byte fields from among a format identifier, group identifier, group length, mode of operation and modulus of operation.

4. The method for upgrading a terminal to terminal link within a telecommunication system according to claim 1, wherein the step of determining if said link is established further comprises:

waiting one second.

5. The method for upgrading a terminal to terminal link within a telecommunication system according to claim 1, wherein the step of sending a frame to try to establish said link a predetermined number of times further comprises:

retrying three times.

6. The method for upgrading a terminal to terminal link within a telecommunication system according to claim 1, wherein said set mode command includes a plurality of bytes and wherein further the step of decoding said set mode command further comprises:

decoding byte four of said plurality of bytes within said set mode command.

7. An information handling system, comprising:

means for sending a first link command frame generated via a first communication protocol to establish a link, said first link command frame including an identifying byte field;

means for determining if said link is established;

means, when said link is established for decoding a set mode command in accordance with International Telecommunication Union's Q.921 protocol specification; and means, when said link is not established by said first link command frame, for sending a second link command frame generated via a second communication protocol including a different identifying byte field.

8. An information handling system according to claim 7, wherein said means for establishing the link includes means for decoding byte four within said set mode command.

9. An information handling system according to claim 8, wherein said means for establishing the link includes means for decoding one or more byte fields including a format identifier, group identifier, group length, mode of operation and modulus of operation within said set mode command.

10. An information handling system according to claim 7, wherein said means for determining if said link is established includes means for waiting a predetermined time interval.

11. An information handling system according to claim 7, wherein said means for determining if said link is established includes waiting one second.

12. An information handling system according to claim 7, wherein said means for determining if said link is established includes means for trying to establish said link a predetermined number of times.

13. An information handling system according to claim 7, wherein said means for determining if said link is established includes means for retrying to establish said link with said first link command frame three times.

14. An information handling system according to claim 7, wherein said means for sending the second link command frame including a different byte includes means for decoding a set asynchronous balanced mode extended command in accordance with International Telecommunication Union's Q.921 protocol specification.

15. A telecommunication system, comprising:

a first link command frame generated via a first communication protocol utilizing a set mode command including an identifying byte field in accordance with International Telecommunication Union's Q.921 Annex E protocol specification, said first frame sent from one or more transmit terminals to establish a link with one or more receive terminals;

said one or more transmit terminals waiting a predetermined time interval to determine if said link is established, wherein if said link is not established trying to establish said link a predetermined number of times; and if said link is not established within said predetermined number of times sending a second link command frame generated via a second communication protocol utilizing a set asynchronous balanced mode extended command having a different identifying byte field in accordance with International Telecommunication Union's Q.921 protocol specification, said second frame sent to said one or more receive terminals to establish said link.

16. The telecommunications system of claim 15, further comprising means for decoding a set mode command in accordance with International Telecommunication Union's Q.921 Annex E protocol specification.

17. A computer program product residing on a computer usable medium for upgrading a terminal to terminal link within an information handling system, said program product comprising:

instruction means for establishing a link by sending a first link command frame generated via a first communication protocol, said first link command frame including an identifying byte field;

instruction means for determining if said link is established;

instruction means for decoding a set mode command in accordance with International Telecommunication Union's Q.921 Annex E protocol specification when said link is established; and instruction means for sending a second link command frame including a different identifying byte field if said link is not established by said first link command frame.

* * * * *

UNITED STATES PATENT AND TRADEMARK OFFICE
CERTIFICATE OF CORRECTION

PATENT NO. : 6,707,830 B1
DATED : March 16, 2004
INVENTOR(S) : Brown et al.

It is certified that error appears in the above-identified patent and that said Letters Patent is hereby corrected as shown below:

Column 6,
Line 27, please insert -- a -- in between "steps" and "through".

Signed and Sealed this

Fifth Day of April, 2005

JON W. DUDAS
*Director of the United States Patent and Trademark Office*